United States Patent
Gao et al.

(10) Patent No.: US 10,481,389 B2
(45) Date of Patent: Nov. 19, 2019

(54) CURVED-SURFACE APPARATUS FOR WAVELENGTH CONVERTING

(71) Applicant: IVIEW DISPLAYS (SHENZHEN) COMPANY LTD., Shenzhen (CN)

(72) Inventors: Zhiqiang Gao, Hongkong (CN); Steve Yeung, Hongkong (CN); Augustus Yeung, Shenzhen (CN); Manying Ning, Shenzhen (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 16/206,459

(22) Filed: Nov. 30, 2018

(65) Prior Publication Data

US 2019/0094524 A1 Mar. 28, 2019

Related U.S. Application Data

(63) Continuation of application No. PCT/CN2017/075713, filed on Mar. 6, 2017.

(30) Foreign Application Priority Data

Dec. 12, 2016 (CN) .......................... 2016 1 1139676

(51) Int. Cl.
*G02B 26/00* (2006.01)
*G03B 21/16* (2006.01)
(Continued)

(52) U.S. Cl.
CPC .............. *G02B 26/008* (2013.01); *F21V 9/45* (2018.02); *G03B 21/16* (2013.01); *G03B 21/204* (2013.01); *G03B 21/2013* (2013.01)

(58) Field of Classification Search
CPC ..... F21V 9/30; F21V 9/40; F21V 9/45; G02B 26/008
See application file for complete search history.

(56) References Cited

U.S. PATENT DOCUMENTS

| | | | |
|---|---|---|---|
| 6,266,105 B1 * | 7/2001 | Gleckman | H04N 9/3117 348/743 |
| 9,648,291 B2 * | 5/2017 | Fukui | G03B 21/204 |

(Continued)

FOREIGN PATENT DOCUMENTS

| | | |
|---|---|---|
| CN | 101004542 A1 | 7/2007 |
| CN | 104503195 A | 4/2015 |

(Continued)

OTHER PUBLICATIONS

International Search Report dated May 31, 2017; PCT/CN2017/075713.

*Primary Examiner* — Alexander K Garlen
(74) *Attorney, Agent, or Firm* — IPro, PLLC; Na Xu

(57) ABSTRACT

A curved-surface apparatus for wavelength converting. The apparatus includes: a light source excitation unit comprising a plurality of light source exciters for emitting identical or different excited light, respectively; a wavelength conversion unit provided with annular structure; a plurality of component sets circularly disposed on a curved surface of the annular structure and divided into a plurality of component regions provided with predetermined color wavelength conversion substances; a beam splitter set configured to reflect the excited light emitted by the light source excitation unit and transmit predetermined light; a condenser lens set disposed near the wavelength conversion unit.

10 Claims, 4 Drawing Sheets

(51) Int. Cl.
*G03B 21/20* (2006.01)
*F21V 9/45* (2018.01)

(56) References Cited

U.S. PATENT DOCUMENTS

| | | | | |
|---|---|---|---|---|
| 2003/0117592 A1* | 6/2003 | Janssen | ............... | G02B 5/203 |
| | | | | 353/31 |
| 2011/0310363 A1* | 12/2011 | Kita | ............... | G03B 21/204 |
| | | | | 353/98 |
| 2013/0088850 A1* | 4/2013 | Kroell | ............... | G02B 5/09 |
| | | | | 362/84 |
| 2014/0160441 A1* | 6/2014 | Kim | ............... | G03B 21/204 |
| | | | | 353/33 |
| 2018/0299662 A1* | 10/2018 | Maes | ............... | G02B 26/008 |

FOREIGN PATENT DOCUMENTS

| | | |
|---|---|---|
| JP | H1124164 A | 1/1999 |
| JP | 2002040360 A | 2/2002 |
| JP | 2004286957 A | 10/2004 |
| JP | 2002182128 A | 6/2006 |

* cited by examiner

100

100

US 10,481,389 B2

CURVED-SURFACE APPARATUS FOR WAVELENGTH CONVERTING

CROSS-REFERENCE TO RELATED APPLICATIONS

The present disclosure claims priority to Patent Application No. 201611139676.4, filed with the Chinese Patent Office on Dec. 12, 2016, titled "CURVED-SURFACE APPARATUS FOR WAVELENGTH CONVERTING" and Patent Application No. PCT/CN2017/075713, filed with the Chinese Patent Office on Mar. 6, 2017, titled "CURVED-SURFACE APPARATUS FOR WAVELENGTH CONVERTING", the entire contents of which are incorporated herein by reference.

TECHNICAL FIELD

The disclosure relates to the technical field of light emitting, and in particular to a curved-surface apparatus for wavelength converting.

BACKGROUND

As is well known, an optical image at least consists of light waves with different main wavelengths, such as blue, green and red light waves. Predetermined monochromatic light or polychromatic light is obtained mainly by exciting fluorescent powder with laser light or light sources such as an LED in the fields of lighting sources, projection display and the like, and such scheme usually utilizes the laser light or LED emergent light to enter a fluorescent powder color wheel rotating at a high speed to achieve effects of exciting colored light and dissipating heat.

The color wheel adopted in the prior art is generally a disc type color wheel. The diameter of the color wheel can't be too small in order to achieve the effect of exciting the colored light and meet the requirement on heat dissipation at the same time, and lead to that the thickness of a projector can't be reduced.

SUMMARY

An embodiment of the present disclosure provides a curved-surface apparatus for wavelength converting. The curved-surface apparatus includes: a light source excitation unit comprising a plurality of light source exciters for emitting identical or different excited light respectively; a wavelength conversion unit provided with annular structure; a plurality of component sets circularly disposed on a curved surface of the annular structure and divided into a plurality of component regions provided with predetermined color wavelength conversion substances; a beam splitter set configured to reflect the excited light emitted by the light source excitation unit and transmit predetermined light and a condenser lens set disposed near the wavelength conversion unit; wherein the excited light emitted by the light source exciter is reflected by the beam splitter set, passes the condenser lens set, and penetrates the component region to generate the predetermined light having corresponding color and the predetermined light passes the condenser lens set and projects through the beam splitter set.

Another embodiment of the present disclosure provides a curved-surface apparatus for wavelength converting. The curved-surface apparatus includes: a light source excitation unit comprising a blue light source exciters for emitting blue light; a wavelength conversion unit provided with annular structure; a component set disposed on curved-surface of the annular structure and comprising a first component region having red wavelength conversion substances, a second component region having green wavelength conversion substances and a third component region configured to reflect all color light; a beam splitter set configured to reflect red light and green light and transmit blue light; a second condenser lens set and a third condenser lens set which is disposed near the wavelength conversion unit and a first reflector configured to reflecting all colored light; wherein a red light or blue light is generated respectively, when the blue light emitted by the blue light source exciter obliquely penetrates the first component region or the second component region of the wavelength conversion unit, passes the second condenser set and is reflected at the second beam splitter set to project; the blue light is reflected when the blue light emitted by the blue light source exciter obliquely penetrates the third component region, passes the third condenser set, is reflected to the beam splitter set by the first reflector and project through the beam splitter set.

DETAILED DESCRIPTION

First Embodiment

Figure 1:
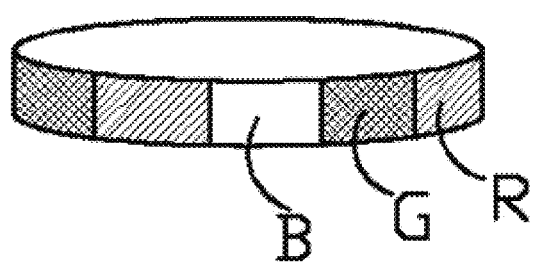
FIG. 1 is a distribution diagram of a wavelength conversion unit according to the first embodiment of the disclosure.

FIG. 1 is distribution diagram of a wavelength conversion unit according to the first embodiment of the disclosure. A wavelength conversion unit 100 is a curved-surface annular structure and includes a component set. The component set includes a first component region R having red wavelength conversion substances, a second component region G having green wavelength conversion substances, and a third component region B being a blank region. The blank region of the third component region B has substrate material of the curved-surface annular structure itself or is a through hole. The component sets are circularly distributed on the wavelength conversion unit 100.

Figure 2:
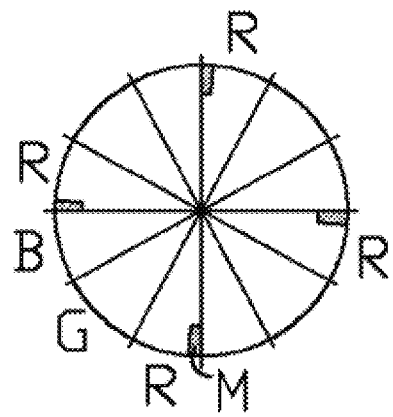
FIG. 2 is a top view of the wavelength conversion unit according to the first embodiment of the disclosure.
Figure 3:
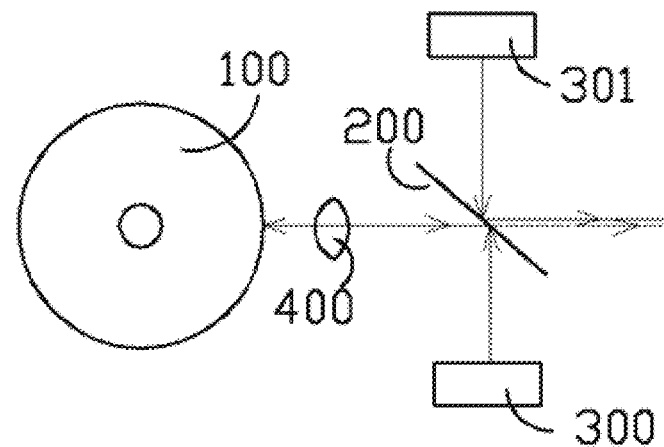
FIG. 3 is a structure diagram of a curved-surface apparatus for wavelength converting according to the first embodiment of the disclosure.

As shown in FIG. 2, each component region has a marker M. The marker M is placed at a portion of an upper surface of the wavelength conversion unit, which is corresponding to a boundary of the first component region R, and a sensing element identifies an initial end of the component region, namely the boundary of the first component region R, by detecting the marker M, so that a color section position is calculated and working states, namely on-off and electric current situations, of light source exciters in a light source excitation unit are controlled. A curved-surface apparatus for wavelength converting utilizing the wavelength conversion unit 100 shown in this example, as shown in FIG. 3, includes: a wavelength conversion unit 100; a light source excitation unit, comprising a first light source exciter 300 capable of generating blue light and a second light source exciter 301 capable of generating blue light; a beam splitter set, namely of a first beam splitter 200 capable of reflecting the blue light and transmitting red light and green light; and a first condenser lens set 400 placed close to the wavelength conversion unit 100. The first light source exciter 300 and the second light source exciter 301 are separated by the first beam splitter 200 and opposite to each other, wherein the blue light emitted by the first light source exciter 300 is reflected at the first beam splitter 200, then passes the first condenser lens set 400 and penetrates the wavelength conversion unit 100 finally, while the blue light emitted by the second light source exciter 301 is reflected to project by the first beam splitter 200.

When the sensing element detecting the marker M, the first light source exciter 300 is started to emit blue light, the blue light is reflected by the first beam splitter 200, go through the first condenser lens set 400 and irradiates the wavelength conversion unit 100; when the blue light is in contact with the first component region R, a red light is generated and reflected. The red light is condensed by the first condenser lens set 400 and transmits out of the curved-surface apparatus through the first beam splitter 200. When the blue light is in contact with the second component region G, a green light is generated and reflected. The green light is condensed by the first condenser lens set 400 and transmits out of the curved-surface apparatus through the first beam splitter 200. When the blue light is in contact with the third component region B, the first light source exciter 300 is shut down and the second light source exciter 301 is started at the same time. The second light source exciter 301 emits another blue light which is reflected out of the curved-surface apparatus for wavelength converting by the first beam splitter 200. To sum up, as the wavelength conversion unit 101 rotating, the red light, green light and blue light are output circularly.

Second Embodiment

Figure 4:
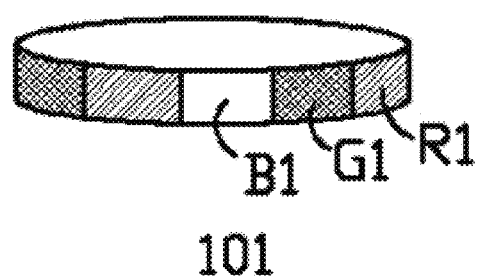
FIG. 4 is a distribution diagram of a wavelength conversion unit according to the second embodiment of the disclosure.

FIG. 4 is distribution diagram of a wavelength conversion unit according to second embodiment of the disclosure. The wavelength conversion unit 101 is of a curved-surface annular structure and includes one component set. The component set comprises a first component region R1 having red wavelength conversion substances, a second component region G1 having green wavelength conversion substances, and a third component regions B1 having a second reflector capable of reflecting all colored light. The second reflector of the third component region B1 and the wavelength conversion unit 101 have identical curvature; and the three component regions are circularly distributed on the wavelength conversion unit 101.

Figure 5:
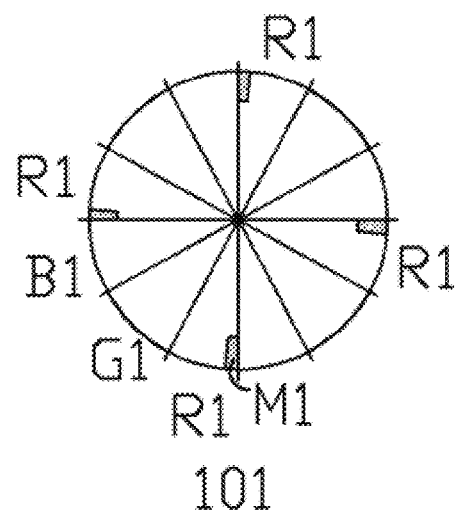
FIG. 5 is a top view of the wavelength conversion unit according to the second embodiment of the disclosure.

As shown in FIG. 5, each component region has a marker M1. The markers M1 are placed at the portion of an upper surface of the wavelength conversion unit, corresponding to the boundaries of the first component regions R1. A sensing element identifies initial ends of the component regions, namely the boundaries of the first component regions R1, by detecting the markers M1, so that color section positions are calculated and working states, namely on-off and electric current situations, of light source exciters in a light source excitation unit are controlled.

Figure 6:
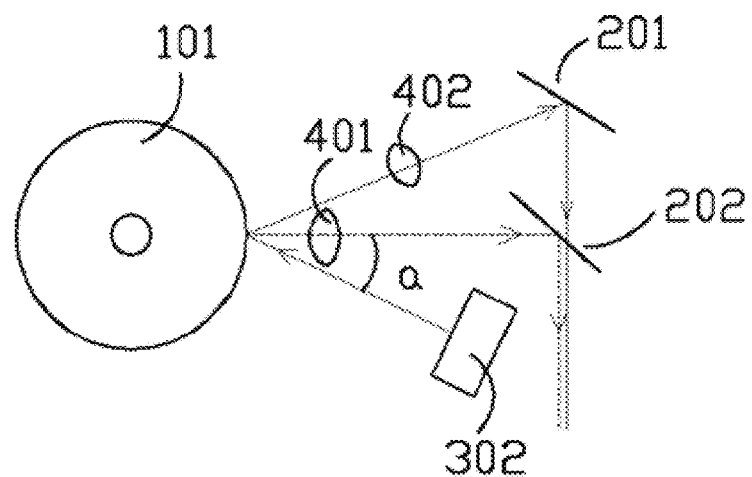
FIG. 6 is a structure diagram of a curved-surface apparatus for wavelength converting according to the second embodiment of the disclosure.

A curved-surface apparatus for wavelength converting utilizing the wavelength conversion unit 101 shown in this embodiment, as shown in FIG. 6, includes: a wavelength conversion unit 101, a light source excitation unit, namely a third light source exciter 302 capable of generating blue light, a beam splitter set having a second beam splitter 202 capable of reflecting red light and green light and transmitting the blue light and a first reflector 201 capable of reflecting all colored light, and a second condenser lens set 401 and a third condenser lens set 402 which are close to the wavelength conversion unit 100, wherein an incidence angle a of the third light source exciter 302 is from 0 to 90 degrees.

When the sensing element identifies marker M1, the third light source exciter 302 is started to emit the blue light, and the blue light penetrates onto the wavelength conversion unit 101 at the incidence angle a. When the blue light is in contact with each first component region R1, red light is generated and reflected. The red light is condensed by the second condenser lens set 401, then reaches the second beam splitter 202 (a light path shown in FIG. 4 is an optimal light path trend, that is the generated red light is emitted out vertically), and transmits out of the curved-surface apparatus through the second beam splitter 202. When the blue light is in contact with each second component region G1, green light is generated and reflected. The green light is condensed by the second condenser lens set 401 and reflected out of the curved-surface apparatus through the second beam splitter 202. When the blue light is in contact with the second reflector of the third component region B1, the blue light is reflected, condensed by the third condenser lens set 402, reflected by the first reflector 201 and transmitted out of the curved-surface apparatus through the second beam splitter 202. To sum up, through rotation of the wavelength conversion unit 100, the red light, green light and blue light are output circularly.

Third Embodiment

Figure 7:
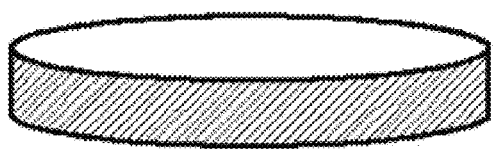
FIG. 7 is a distribution diagram of a wavelength conversion unit according to the third embodiment of the disclosure.

FIG. 7 is distribution diagram of a wavelength conversion unit according to third embodiment of the disclosure. The wavelength conversion unit 102 is of a curved-surface annular structure and includes a component set. The component set includes one component region having green wavelength conversion substances.

Figure 8:
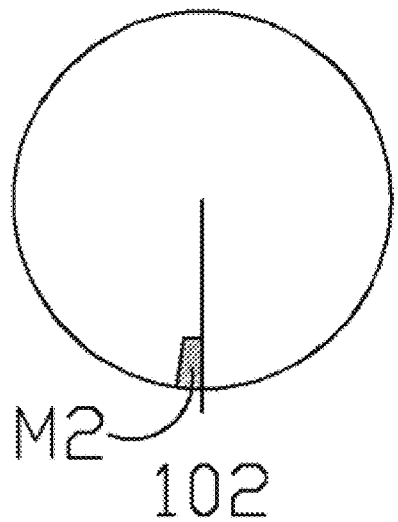
FIG. 8 is a top view of the wavelength conversion unit according to the third embodiment of the disclosure.

As shown in FIG. 8, a marker M2 is placed in any position of an upper surface of the wavelength conversion unit; and a sensing element identifies an initial end of the component region by detecting the marker M2, so that working states, namely on-off situations, of light source exciters of the light source excitation unit, are determined.

Figure 9:
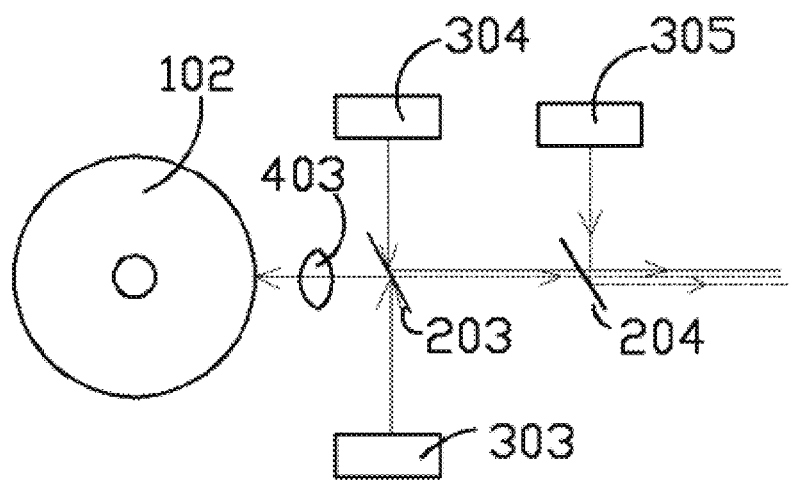
FIG. 9 is a structure diagram of a curved-surface apparatus for wavelength converting according to the third embodiment of the disclosure.

A curved-surface apparatus for wavelength converting utilizing a wavelength conversion unit 102 shown in this embodiment, as shown in FIG. 9, includes a wavelength conversion unit 102, a light source excitation unit having a fourth light source exciter 303 capable of generating blue laser light, a fifth light source exciter 304 capable of generating blue light and a sixth light source exciter 305 capable of generating red light, a beam splitter set having a third beam splitter 203 and a fourth beam splitter 204, and a fourth condenser lens set 403. The third beam splitter 203 reflects the blue light and transmits green light, the fourth beam splitter 204 reflects the red light and transmits the blue light and the green light. The fourth light source exciter 303 and the fifth light source exciter 304 are separated by the third beam splitter 203 and opposite to reach other. Optical axes of the two blue light source exciters are in a same straight line or are parallel.

When the sensing element identifies the marker M2, a blue light emitted by the fourth light source exciter 303 is reflected by the third beam splitter 203, transmit through the fourth condenser lens set 403 and reaches the wavelength conversion unit 102. When the blue light vertically penetrates the wavelength conversion unit 102, green light is generated and reflected. The green light is condensed by the fourth condenser lens set 403, reaches the third beam splitter 203, transmits through the third beam splitter 203 and the fourth beam splitter 204 and project out of the curved-surface apparatus. The fourth light source exciter 303 is shut down, the fifth light source exciter 304 is started and generates another blue light. The blue light generated by the fifth light source exciter 304 is reflected by the third beam splitter 203, reaches the fourth beam splitter 204, transmits through the fourth beam splitter 204 and is projected out of the curved-surface apparatus. The fifth light source exciter 304 is shut down and the sixth light source exciter 305 is started to generate red light. The red light generated by the sixth light source exciter 305 is reflected out of the curved-surface apparatus through the fourth beam splitter 204. During rotation of the wavelength conversion unit 102, the green light, blue light and red light are circularly output by sequentially starting and shutting down the fourth light source exciter 303, the fifth light source exciter 304 and the sixth light source exciter 305. The starting and shutdown sequences of the fourth light source exciter 303, the fifth light source exciter 304 and the sixth light source exciter 305 described above can be changed mutually simply by meeting the requirement that only one light source exciter is started and the other two light source exciters maintain shutdown states.

Each component region of each component set described above is disposed with a fixed angle. When the sensing element detected a initial end of the component set by identifying the marker, a control unit can determined the reached component region and control the on-off states and/or electric current situations of the various light source exciters accordingly.

The markers described above can be placed either on the upper surface or a lower surface of the wavelength conversion unit. The upper surface and the lower surface of the wavelength conversion unit are totally closed, or hollow and the like. The markers can be placed at the boundaries of the first component regions or other component regions, leading to changes in corresponding colored light output sequences. The makers not only act as initial ends, but also is used for determining a rotation state of the wavelength conversion unit. When the wavelength conversion unit doesn't rotate or a rotating speed of the wavelength conversion unit is not sufficient, the state of the marker sensed by the sensing element is fed back to the control unit to shut down the light source excitation unit, so that a protecting effect is played.

The markers M, M1 and M2 described above are black adhesive tapes; and the component sets of the wavelength conversion unit can be combined differently according to practical situations and are not limited.

The above-mentioned embodiments are only embodiments of the disclosure and are not thus used to limit the scope of protection of the disclosure, and any equivalent structure, or equivalent flow transformation made by using the contents of the description and drawings of the disclosure, or directly or indirectly applied to other related technical fields shall be incorporated in the patent protection range of this disclosure.

What is claimed is:

1. A curved-surface apparatus for wavelength converting, comprising
   a light source excitation unit comprising a plurality of light source exciters for emitting identical or different excited light, respectively;
   a wavelength conversion unit provided with an annular structure;
   a plurality of component sets circularly disposed on a curved surface of the annular structure and divided into a plurality of component regions provided with predetermined color wavelength conversion substances;
   a beam splitter set configured to reflect the excited light emitted by the light source excitation unit and transmit a predetermined light;
   a condenser lens set disposed near the wavelength conversion unit;
   wherein the excited light emitted by the light source exciter is reflected by the beam splitter set, passes through the condenser lens set, and penetrates the component region to generate the predetermined light having a corresponding color and the predetermined light passes through the condenser lens set and projects through the beam splitter set.

2. The curved-surface apparatus according to claim 1, wherein one of the plurality of component sets comprises a first component region having red wavelength conversion substances, a second component region having green wavelength conversion substances, and a third component region being a blank region.

3. The curved-surface apparatus according to claim 2, wherein the light source excitation unit comprises two blue light source exciters and the beam splitter set is provided with a first beam splitter configured to reflect blue light and transmit red light and green light.

4. The curved-surface apparatus according to claim 3, wherein the two blue light source exciters are disposed opposite to each other and separated by the first beam splitter;
   wherein a blue light emitted by one of the blue light source exciters is reflected at the first beam splitter, passes through the condenser lens set and penetrates the wavelength conversion unit, while another blue light emitted by the other one blue light source exciter is reflected at the first beam splitter and emitted outwards.

5. The curved-surface apparatus according to claim 1, wherein one of the plurality of component sets comprises a component region having green wavelength conversion substances.

6. The curved-surface apparatus according to claim 5, wherein the light source excitation unit comprises two blue light source exciters and one red light source exciter and the beam splitter set comprises: a third beam splitter configured to reflect blue light and transmit green light and a fourth beam splitter configured to reflect the blue light and transmit the green light and red light.

7. The curved-surface apparatus according to claim 6, wherein the two blue light source exciters are disposed opposite to each other and separated by the third beam splitter;
   an optical axes of the two blue light source exciters being in a same straight line or parallel;
   wherein a red light emitted by the red light source exciter is reflected at the fourth beam splitter and a blue light emitted by one of the blue light source exciters is reflected at the third beam splitter, passes through the condenser lens set and penetrates the wavelength conversion unit, while another blue light emitted by the other one blue light source exciter is reflected at the third beam splitter and project through the fourth beam splitter.

8. The curved-surface apparatus according to claim 1, wherein the component sets are each provided with a marker for identifying an initial position of each component set;
   wherein a working state of the light source exciter of the light source excitation unit is determined according to the initial position of each component set.

9. A curved-surface apparatus for wavelength converting, comprising:
   a light source excitation unit comprising a blue light source exciter for emitting blue light;
   a wavelength conversion unit provided with an annular structure;
   a component set disposed on a curved-surface of the annular structure and comprising a first component region having red wavelength conversion substances, a second component region having green wavelength conversion substances, and a third component region configured to reflect all colored light;
   a beam splitter set configured to reflect red light and green light and transmit blue light;
   a second condenser lens set and a third condenser lens set which are disposed near the wavelength conversion unit;
   a first reflector configured to reflect all colored light;
   wherein a red light or blue light is generated respectively, when the blue light emitted by the blue light source exciter obliquely penetrates the first component region or the second component region of the wavelength conversion unit, passes through the second condenser set and is reflected at the second beam splitter set to project;
   the blue light is reflected when the blue light emitted by the blue light source exciter obliquely penetrates the third component region, passes the third condenser set, is reflected to the beam splitter set by the first reflector and projected through the beam splitter set.

10. The curved-surface apparatus according to claim 9, wherein the component set is provided with a marker for identifying an initial position of the component set;
   wherein a working state of the light source exciter of the light source excitation unit is determined according to the initial position of the component set.

* * * * *